(12) United States Patent
Wegelin et al.

(10) Patent No.: US 9,357,888 B2
(45) Date of Patent: *Jun. 7, 2016

(54) HYGIENE COMPLIANCE MONITOR FOR A DISPENSING CONTAINER

(71) Applicant: GOJO Industries, Inc., Akron, OH (US)

(72) Inventors: Jackson W. Wegelin, Stow, OH (US); Matthew J. Archer, Aurora, OH (US)

(73) Assignee: GOJO Industries, Inc., Akron, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/805,923

(22) Filed: Jul. 22, 2015

(65) Prior Publication Data

US 2015/0332579 A1 Nov. 19, 2015

Related U.S. Application Data

(63) Continuation of application No. 13/607,904, filed on Sep. 10, 2012, now Pat. No. 9,131,811.

(60) Provisional application No. 61/537,722, filed on Sep. 22, 2011.

(51) Int. Cl.
*A47K 5/12* (2006.01)
*B05B 11/00* (2006.01)
*G08B 21/24* (2006.01)

(52) U.S. Cl.
CPC ............. *A47K 5/1217* (2013.01); *A47K 5/1202* (2013.01); *A47K 5/1205* (2013.01); *B05B 11/308* (2013.01); *G08B 21/245* (2013.01)

(58) Field of Classification Search
CPC ........................... A47K 5/1202; A47K 5/1217
See application file for complete search history.

(56) References Cited

U.S. PATENT DOCUMENTS

| 5,625,659 A * | 4/1997 | Sears | G01F 11/088 377/21 |
| 2006/0231568 A1* | 10/2006 | Lynn | A47K 5/1202 222/52 |
| 2010/0021349 A1* | 1/2010 | Boehm | B01L 3/0206 422/400 |
| 2010/0108410 A1* | 5/2010 | Yeh | G06F 3/046 178/18.07 |
| 2010/0213279 A1* | 8/2010 | Frederick | E03C 1/046 239/310 |
| 2010/0288788 A1* | 11/2010 | Ophardt | A47K 5/1217 222/1 |

* cited by examiner

*Primary Examiner* — Van Trieu
(74) *Attorney, Agent, or Firm* — Renner, Kenner, Greive, Bobak, Taylor and Weber

(57) ABSTRACT

A hygiene compliance monitor for a dispensing container that dispenses material when a dispensing nozzle is actuated, includes a flexible main section having a receiving aperture through which the dispensing nozzle extends, so as to enable the main section to be removably attached to the dispensing container. Extending from the main section is a secondary section that is terminated by an attachment sleeve that is configured to removably retain the dispensing nozzle therein. A token, such as a magnet, is carried by the attachment sleeve and is detected by a sensor carried by the main section. Thus, when the dispensing nozzle is actuated to dispense material, the sensor detects the presence and non-presence of the token and accordingly updates a count value that is presented on a display that represents the number of actuations of the dispensing nozzle.

15 Claims, 19 Drawing Sheets

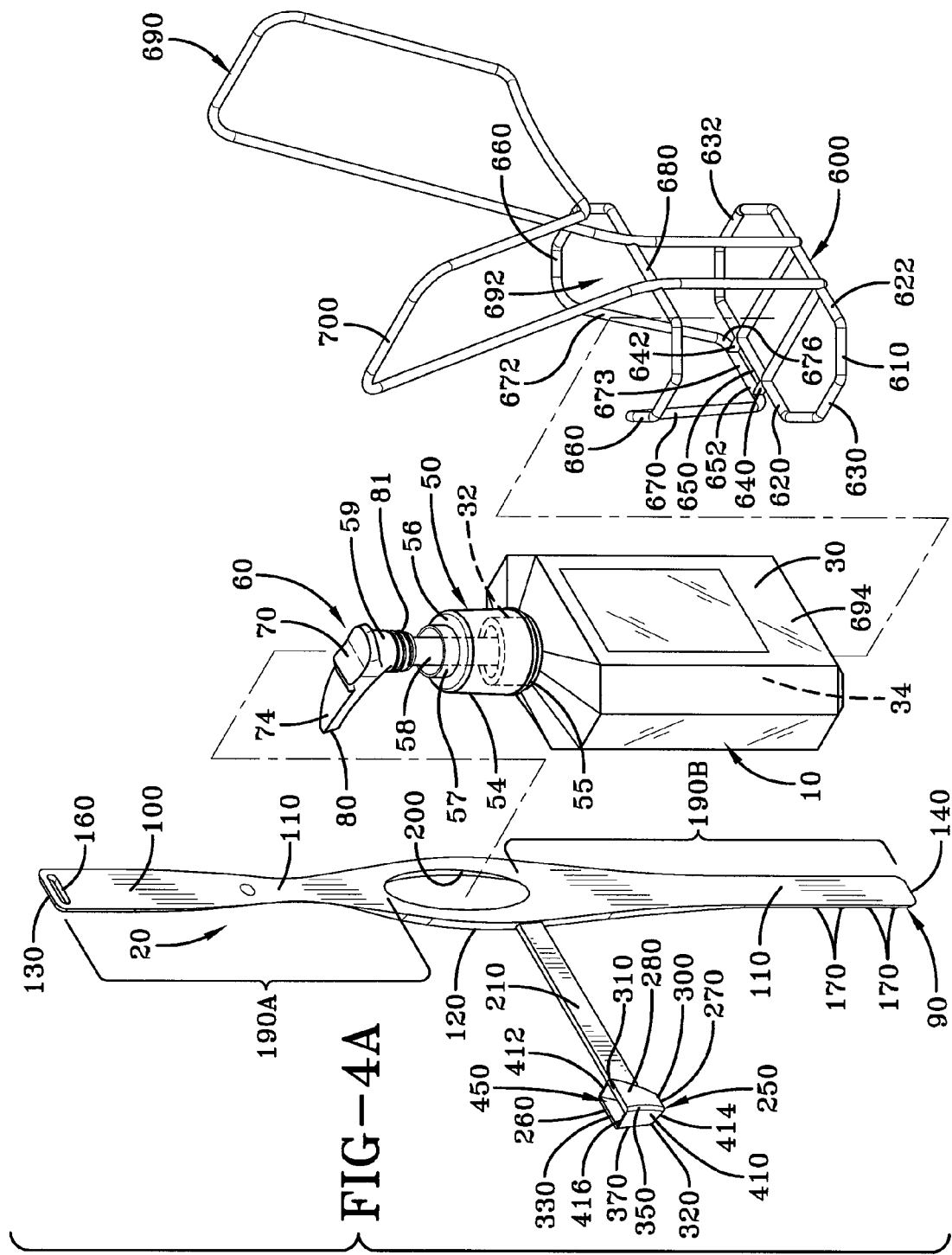

US 9,357,888 B2

HYGIENE COMPLIANCE MONITOR FOR A DISPENSING CONTAINER

CROSS-REFERENCE TO RELATED APPLICATIONS

This application is a continuation of U.S. application Ser. No. 13/607,904 filed on Sep. 10, 2012 now U.S. Pat. No. 9,131,811, which claims the benefit of U.S. Provisional Application No. 61/537,722 filed on Sep. 22, 2011, whereby the content of each application is incorporated herein by reference.

TECHNICAL FIELD

The present invention generally relates to dispensing containers that dispense material, such as soap. Particularly, the present invention relates to a hygiene compliance monitor for a dispensing container, such as a disposable or refillable dispensing container. More particularly, the present invention relates to a hygiene compliance monitor that provides a display to identify the number of hygiene events that have been performed at a dispensing container.

BACKGROUND OF THE INVENTION

Recently, the public has become increasingly concerned with disease and its transmission, and as such, there is an increased awareness of the importance of cleansing and hygiene in general. For example, with respect to the transmission of E. coli in the food services industry, the rhinovirus in elementary schools, and nosocomial diseases within healthcare facilities, numerous studies have cited hand hygiene as an effective measure to guard against disease transmission. In response, the health care industry, the food services industry, and the hotel and travel industries have been forced to examine their protocols and procedures to ensure that their personnel adopt hand-sanitizing habits that are efficacious in the prevention of disease transmission.

In response, as an effort to provide sufficient opportunities for individuals to have access to soap and sanitizers, many institutions and industries have provided numerous disposable or refillable (reusable) dispensing containers of sanitizer and/or soap to facilitate individuals in their efforts to sanitize and/or wash their hands. And while the availability of such dispensing containers has increased the opportunities for individuals to wash and/or sanitize their hands, there is still a lack of compliance with predetermined hand washing hygiene standards. However, to minimize the potential transmission of bacteria and/or viruses by hand washing and sanitization, full compliance with hygiene standards is required, as the failure of one individual to properly sanitize his or her hands can negate the efforts of others who come in contact with such individuals. Unfortunately, to ensure compliance with predetermined hygiene standards, current hygiene compliance monitoring systems that are configured to track hygiene compliance of users require the use of one or more permanently-installed or mounted soap/sanitizer dispensers. Unfortunately, such permanently-installed dispensers are costly and typically require specialized training to administrate. Moreover, integrating hygiene compliance monitoring functionality provided by such permanently-installed dispensers into each disposable or refillable dispensing container would impart a substantial cost to the manufacture of otherwise inexpensive dispensing containers. Thus, the widespread use of such costly dispensing containers would limit their use, which is unwanted.

Therefore, there is a need for a hygiene compliance monitor that is configured to be removably attached to a dispensing container, such as a refillable or disposable dispensing container or other portable dispensing container. In addition, there is a need for a self-powered hygiene compliance monitor for a dispensing container. Furthermore, there is a need for a hygiene compliance monitor for a dispensing container that is low-cost.

SUMMARY OF THE INVENTION

In light of the foregoing, it is one aspect of the one aspect the present invention to provide a hygiene compliance monitor for a dispensing container.

It is another aspect the present invention to provide a hygiene compliance monitor for a dispensing container that has a nozzle from which to dispense liquid material. The compliance monitor includes an elongated main section that has opposed ends that are configured to be removably attached to each other. A receiving aperture is disposed through the main section to receive the nozzle of the dispensing container therethrough. The compliance monitor also includes a controller, which is carried by the main section and coupled to a sensor and a display. Extending from the main section is a secondary section that includes a sleeve adapted to receive the nozzle of the dispensing container. The sleeve also carries a magnet, such that as the nozzle is actuated, the presence and non-presence of the magnet is detected by the sensor to update a count value at the controller, whereupon it is presented on the display.

BRIEF DESCRIPTION OF THE DRAWINGS

These and other features and advantages of the present invention will become better understood with regard to the following description and accompanying drawings where:

FIG. 4A is a perspective view of the dispensing container and a retainer utilized with the hygiene compliance monitor in accordance with the concepts of the present invention;

DETAILED DESCRIPTION OF THE INVENTION

Figure 1:
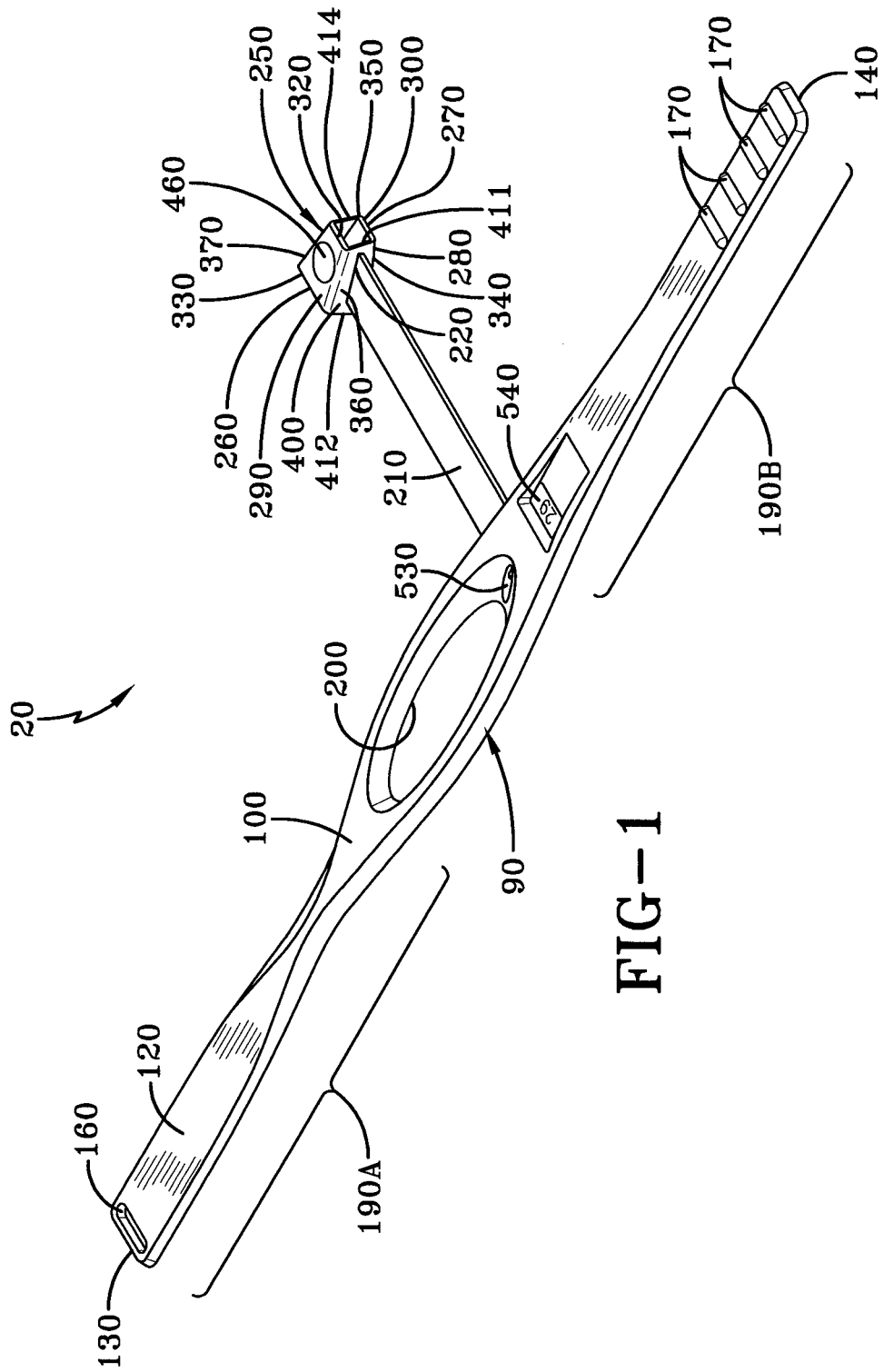
FIG. 1 is a perspective view of a hygiene compliance monitor for a dispensing container in which a magnet carried by an attachment sleeve is detected by a magnetic sensor in accordance with the concepts of the present invention.

A hygiene compliance monitor for a dispensing container 10 is generally referred to by the numeral 20, as shown in FIGS. 1-4 of the drawings. The dispensing container 10, shown clearly in FIG. 4A, includes a vessel 30 that holds any desired liquid material, such as soap, sanitizer, or moisturizer for example. In one aspect, it should be appreciated that the dispensing container 10 may comprise any suitable container, such as a disposable or refillable dispensing container or portable container. Extending from one end of the vessel 30 is a neck 32 that opens into a void 34 created by the vessel 30. A pump assembly 50 is threadably attached to the neck 32 by a collar 54 so as to enable users to pump material out of the vessel 30 and into their hands when actuated. The collar 54 includes a base end 55 and an opposed top end 56, whereby an annular collar neck 57 extends from the top end 56. Extending through the collar neck 57 is a tube 58 that is attached at one end to a nozzle neck 59 provided by a pump or dispensing nozzle 60 at one end, while the other end of the tube 58 is configured to be in fluid communication with the liquid material carried in the void 34 of the vessel 30 of the dispensing container 10.

Specifically, the pump or dispensing nozzle 60 includes a substantially planar engagement base 70 from which extends a nozzle end 74 that tapers from the engagement base 70 to a nozzle tip 80, and which curves downward away from the engagement base 70. As such, the tapered and curved shape of the nozzle end 74 of the pump nozzle 60 allows the dispensed material to be directed downward toward the hands of a user when material is dispensed. Also extending from the nozzle base 70 at a substantially right angle is the nozzle neck 59 that includes a threaded section 81 that is configured to be threadably received by the collar neck 57 of the collar 54 so as to threadably lock the pump nozzle 60 thereto. To dispense material from the dispensing container 10, the pump nozzle 60 is compressed by pressing the engagement base 70, whereupon liquid material is drawn from the tube 58 out of the dispensing container 10 and is dispensed from the nozzle tip 80 of the nozzle end 74. That is, when the dispensing nozzle 60 is actuated, it moves relative to the collar 54.

Referring now to FIGS. 1-4, the hygiene compliance monitor 20 comprises a body 90 having an elongated main section 100 having an inner surface 110 and an opposed outer surface 120. The main section 100 also includes opposed ends 130 and 140, whereby a lock slot 160 is disposed at end 130 and a plurality of spaced engagement tabs 170 that extend from the outer surface 120 of the main section 100 at a substantially right angle are disposed at end 140. Disposed through the main section 100 about its midpoint is a receiving aperture 200 that is adapted to receive the pump assembly 50 of the dispensing container 10 therethrough. As such, the receiving aperture 200 separates the elongated main section 100 into intermediate sections 190A and 190B, such that the intermediate section 190A is disposed between end 130 and the receiving aperture 200, and the intermediate section 190B is disposed between the end 140 and the receiving aperture 200.

Extending from about the approximate midpoint of the main section 100 of the body 90 at a substantially right angle is an elongated secondary section 210 that is terminated at its free end 220 by an attachment sleeve 250. The attachment sleeve 250 includes a receiving end 260 that is substantially opposite to an exit end 270 and is tapered such that the exit end 270 has a smaller cross-sectional area than the receiving end 260. Specifically, the attachment sleeve 250 comprises upper and lower spaced trapezoidal or tapered sections 280 and 290 having respective parallel edges 300,310 and 320, 330 and respective angled edges 340,350 and 360,370. In addition, the upper and lower trapezoidal or tapered sections 280 and 290 are joined by an inner lateral section 400 that extends between the angled edge 340 of the upper section 280 and the angled edge 360 of the lower section 290, and an outer lateral section 410 that extends between the angled edge 350 of the upper section 280 and the angled edge 370 of the lower section 290. Specifically, the inner lateral section 400 has opposed ends 411 and 412, while the outer lateral section 410 has opposed ends 414 and 416. As such, edges 310,330,412, 416 define the receiving end 260 of the sleeve 250, while the edges 300,320,411,414 define the exit end 270 of the sleeve 250. Furthermore, the upper and lower trapezoidal or tapered sections 280,290 and the lateral sections 400,410 of the attachment sleeve 250 form a receiving cavity 450 that is dimensioned to receive the nozzle end 74 of the pump nozzle 60 therethrough to threadably attach or secure the attachment sleeve 250 to the pump nozzle 60. It should be appreciated that the upper and lower sections 280,290 and/or the lateral sections 400,410 may be curved or otherwise configured to accommodate the curvature or tapered profile of the nozzle end 74 of the dispensing container 10. It should also be appreciated that the main section 100 and the secondary section 210 of the compliance monitor 20 may be formed from any suitable flexible material, such as silicone, rubber, plastic, and the like. Moreover, the main section 100 may be formed of stretchable material, which allows the compliance monitor 20 to be securely attached to dispensing containers 10 of various shapes and sizes.

Figure 2:
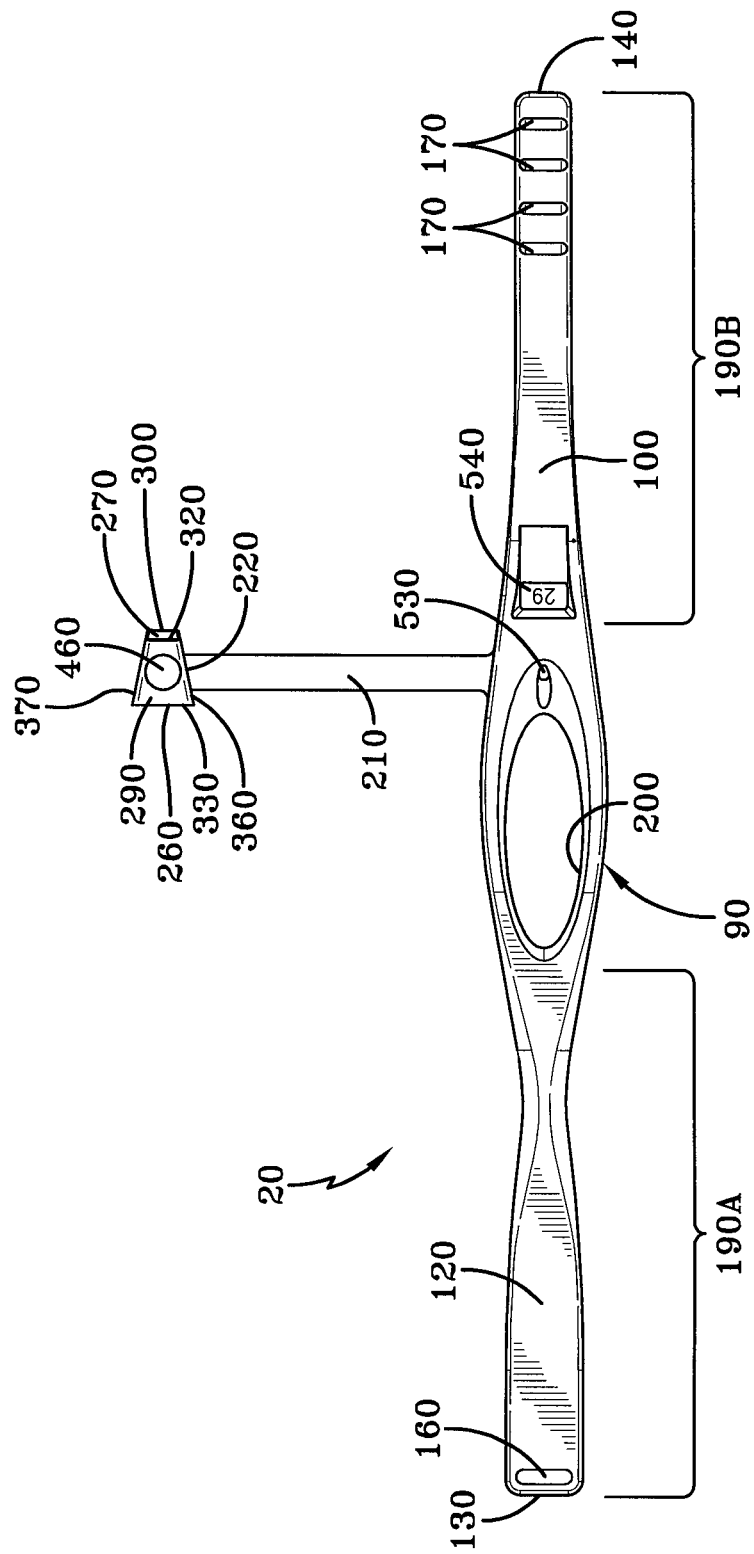
FIG. 2 is a top plan view of the hygiene compliance monitor in accordance with the concepts of the present invention.
Figure 3:
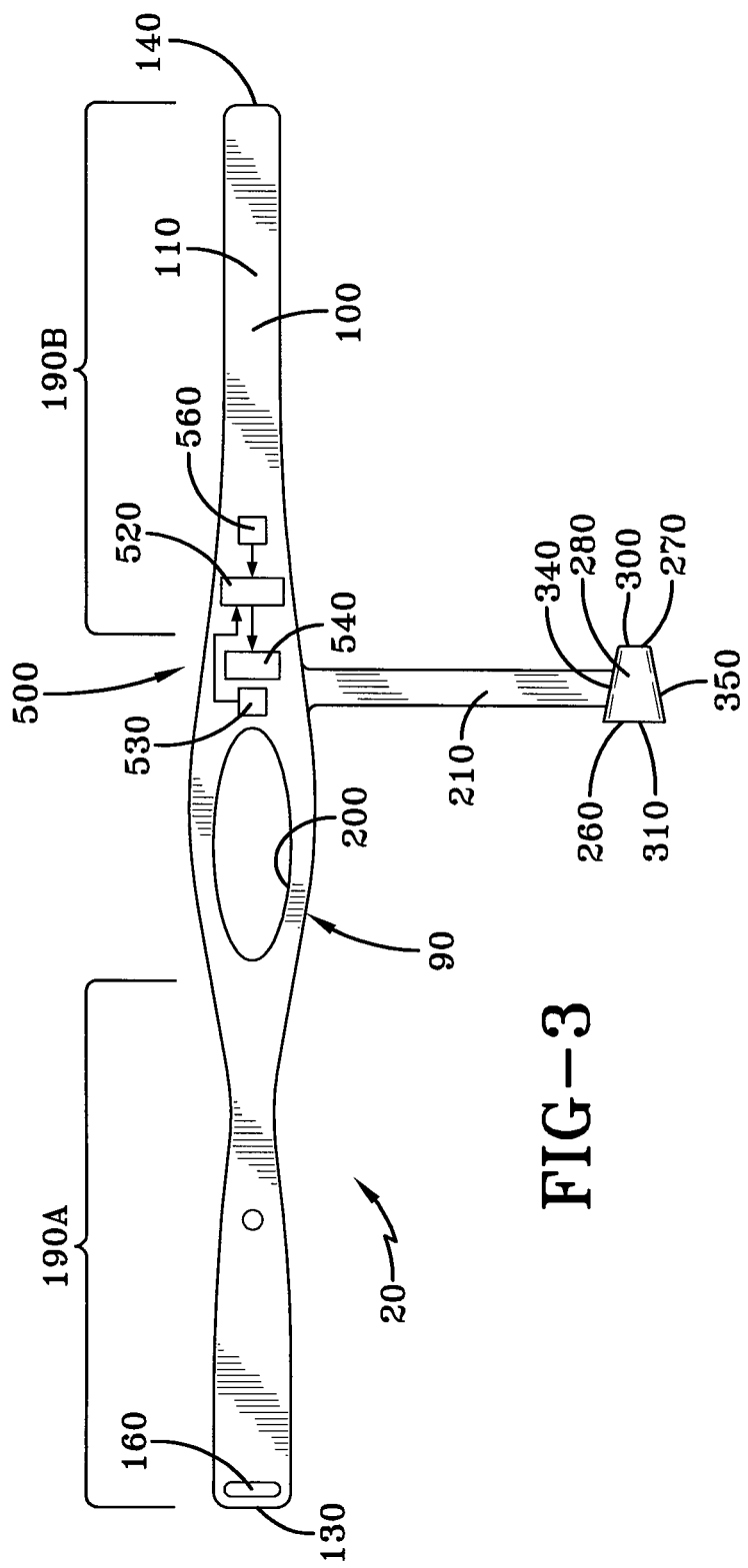
FIG. 3 is a bottom plan view of the hygiene compliance monitor in accordance with the concepts of the present invention.

Disposed in the lower trapezoidal section 290 of the attachment sleeve 250 is a token 460, such as a magnet, as shown in FIG. 2, that is configured to be detected by a detection circuit 500 that is disposed within the intermediate section 190B of the main section 100 of the hygiene compliance monitor 20. Specifically, the detection circuit 500 includes a controller 520 that includes the necessary hardware and/or software to carry out the functions to be discussed. Coupled to the controller 520 is a sensor 530, such as a magnetic sensor or hall sensor, that is mounted in the intermediate section 190B of the main section 100 adjacent to the receiving aperture 200, and which is configured to detect the presence and non-presence of the magnet 460 that is carried by the attachment sleeve 250. It should be appreciated that the token 460 may comprise any suitable device, such as a magnet, an RFID (radio frequency identification) data tag, or bar code for example that is detectable by the sensor 530. As such, the sensor 530 may comprise any suitable sensor, such as a magnetic or hall sensor, an RFID reader; a bar code scanner, or IR (infrared sensor) for example that is suitable for detecting the presence and non-presence of the token 460. A display 540, such as an LCD (liquid crystal display) or any other suitable display, is also coupled to the controller 520 to present various hygiene compliance data in a manner to be discussed. Moreover, a power source 560 is coupled to the controller 520 to power the detection circuit 500 and may comprise any suitable power source, such as a battery or photovoltaic cell for example.

Figure 4B:
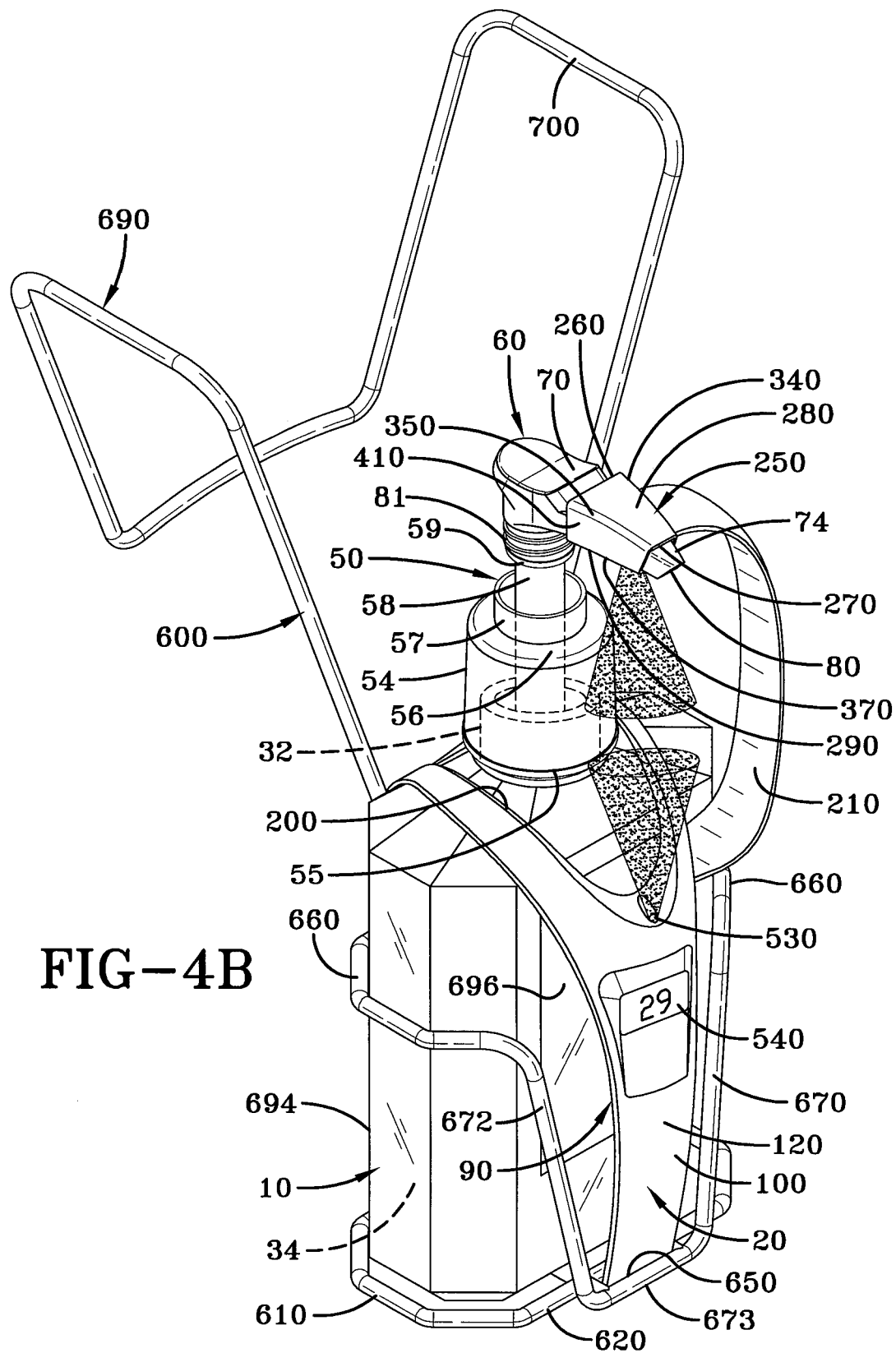
FIG. 4B is a perspective view of the hygiene compliance monitor attached to the dispensing container and the retainer, whereby the magnet carried by the attachment sleeve is not detected by the magnetic sensor in accordance with the concepts of the present invention.
Figure 4C:
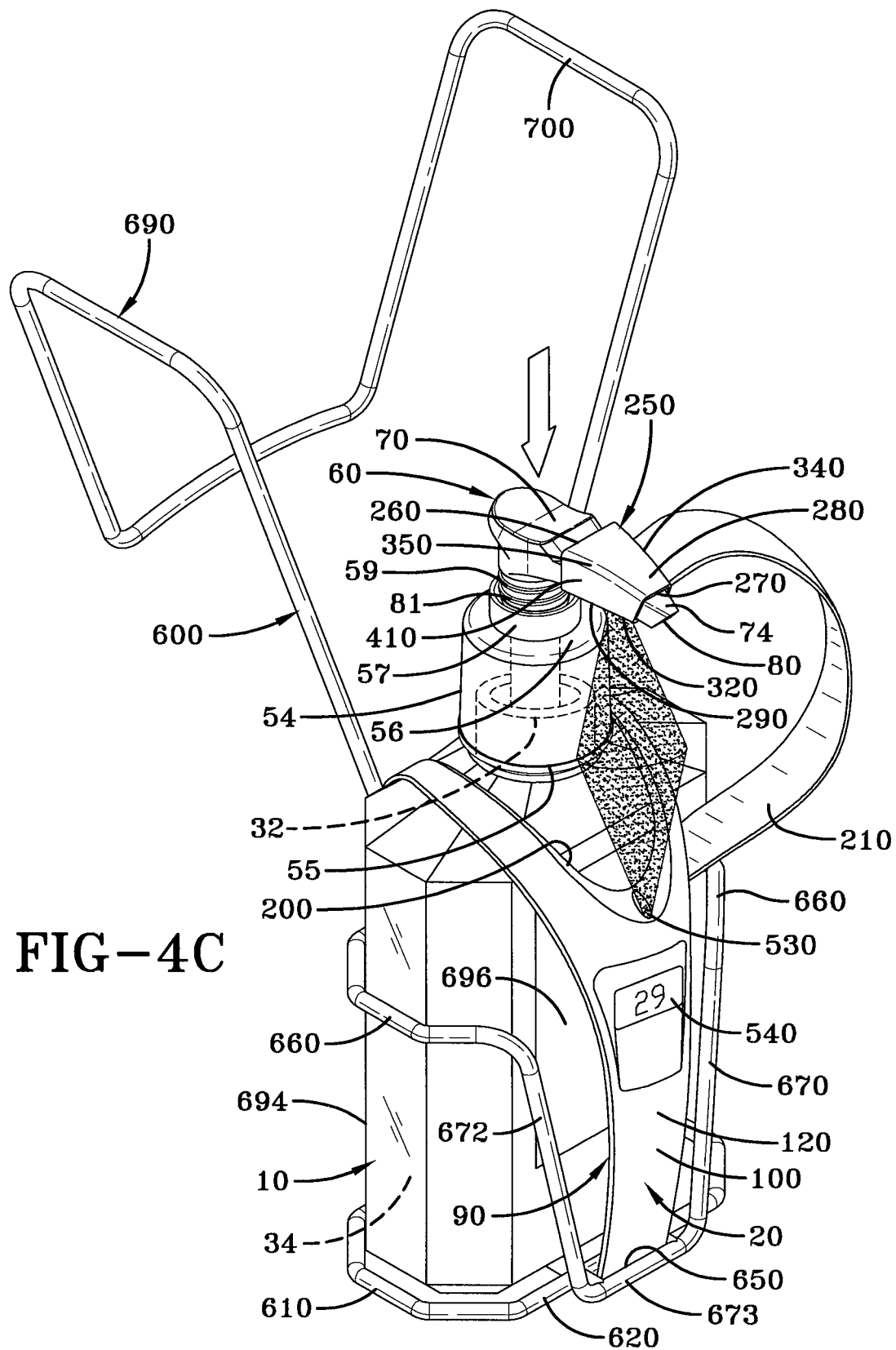
FIG. 4C is a perspective view of the hygiene compliance monitor showing that the magnet carried by the attachment sleeve is detected by the magnetic sensor in accordance with the concepts of the present invention.

In order to utilize the compliance monitor 20, the dispensing container 10 is placed in a retainer 600, as shown in FIGS. 4A-C. The retainer 600 comprises a lattice structure that includes a base 610 having opposed front and rear members 620 and 622 that are joined by opposed lateral members 630 and 632. Extending from the front member 620 of the base 610 at a substantially right angle are a pair of spaced offset members 640 and 642 that form a receiving slot 650 therebetween. Attached to the offset members 640,642 is a retention section 660 that includes spaced retention arms 670 and 672 that extend upward from a base arm 673 and that are attached to the offset members 640 and 642. The retention arms 670 and 672 are joined by a rear arm 680 that is curved or contoured to accommodate the cross-sectional profile of the dispensing container 10. Attached to the base 610 and to the retention section 680 is an attachment arm or hanger 690, which includes an attachment hook section 700. As such, the attachment hook section 700 facilitates the attachment of the retainer 600 to various structures where the presence of the dispensing container 10 is desired. Moreover, the base 610 and the retention section 660 serve to form a receiving cavity 692 that is configured to receive and retain the dispensing container 10 within the retainer 600, while allowing the compliance monitor 20 to be placed through the receiving slot 650, so as to retain the dispensing container 10 to the retainer 600.

Thus, with the components of the dispensing container 10, the compliance monitor 20, and the retainer 600 set forth, the manner of placing the compliance monitor 20 into use will now be presented. Initially, the dispensing container 10 is placed in the receiving cavity 692 of the retainer 600, while the pump nozzle 60 of the pump assembly 50 is placed through the receiving aperture 200 of the compliance monitor 20, such that the inner surface 110 of the main section 100 is adjacent to the dispensing container 10. That is, the compliance monitor 20 is attached to the dispensing container 10, such that the intermediate section 190A is proximate to a rear surface 694 of the dispensing container 10, and the intermediate section 190B is adjacent to a front surface 696 of the dispensing container 10. Once the compliance monitor 20 is positioned, the attachment sleeve 250 is then placed over and secured to the nozzle end 74 of the pump nozzle 60 of the dispensing container 10. That is, the nozzle end 74 of the pump nozzle 60 is placed within the receiving cavity 450 of the attachment sleeve 250, such that the nozzle tip 80 extends beyond the exit end 270, thus securing the nozzle end 74 to the attachment sleeve 250.

Continuing, the intermediate section 190B is placed through the slot 650 of the retainer 600, while the intermediate section 190A is placed so that it extends over the retention section 660 and the rear member 622 of the base 610. Next, the end 140 of the intermediate section 190B is placed through the lock slot 160 of the intermediate section 190A, whereupon the engagement tabs 170 engage the slot 160, thereby locking the intermediate sections 190A and 190B together and retaining the compliance monitor 20 to the dispensing container 10 and to the retainer 600.

Thus, during operation of the compliance monitor 20, the pump nozzle 60 is depressed in order to dispense liquid material, such as soap, sanitizer, or moisturizer for example, from the dispensing container 10. As the pump nozzle 60 is compressed from its normal position shown in FIG. 4B, the token 460, such as a magnet for example, in the attachment sleeve 250 is moved so that it is brought within the detection range of the magnetic sensor 530, as shown in FIG. 4C. Once the presence of the token 460 is detected, the controller 520 updates an internal counter, which maintains an updated count value of the total number of pump nozzle 60 actuations or depressions, which signifies the number of completed hand hygiene events that have occurred, and then presents it upon the display 540. Furthermore, while the compliance monitor 20 is discussed as being used in association with the retainer 600, it should be appreciated that such is not required and that the compliance monitor 20 may be directly attached to the dispensing container 10 without the use of the retainer 600. It is also contemplated that the vessel 30 of the dispensing container 10 may be formed or configured so that the compliance monitor 20 may be readily attached in a compatible manner, so as to obviate the need for use of the retainer 600.

It should also be appreciated that while the compliance monitor 20 and retainer 600 is shown for use on a dispensing container 10 in which the vessel 30 has a substantially rectangular cross-section, the compliance monitor 20 and the retainer 600 may be readily modified to accept dispensing containers 10 that have vessels 30 of any cross-sectional shape, such as curvilinear, rectilinear, or a combination of both.

Figure 5:
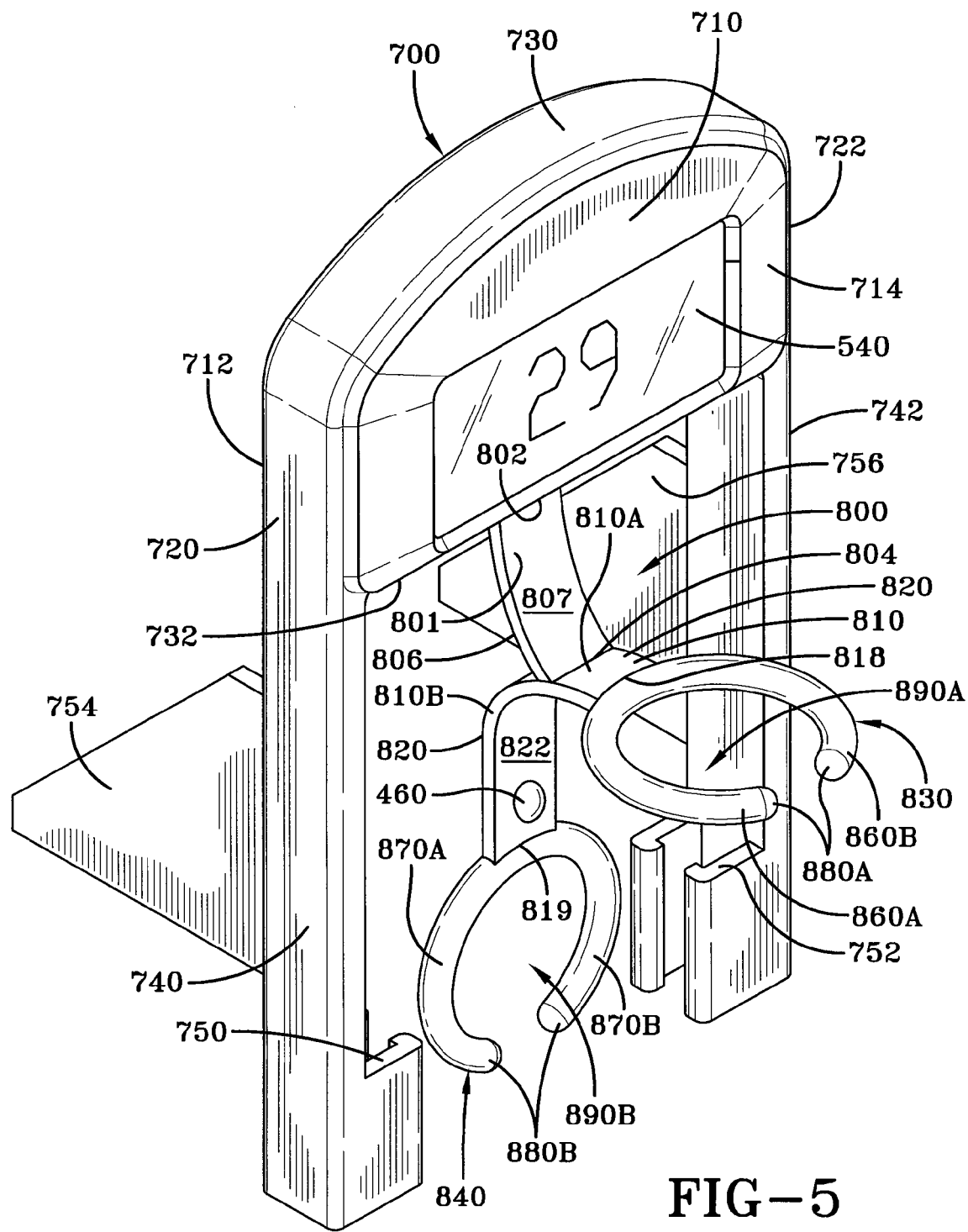
FIG. 5 is a perspective view of an alternative embodiment of the hygiene compliance monitor in accordance with the concepts of the present invention.
Figure 6:
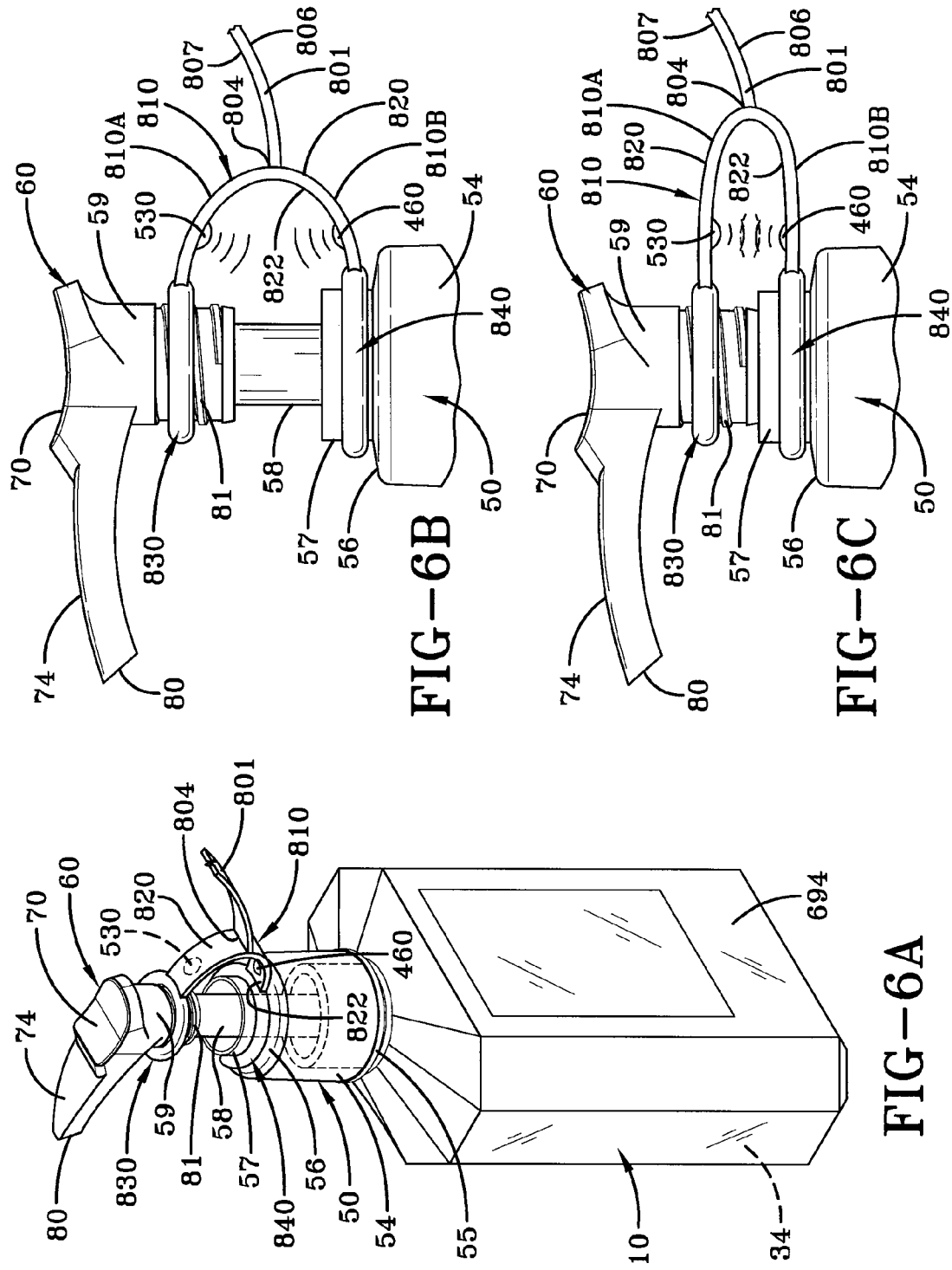
FIG. 6A is a perspective view of the alternative hygiene compliance monitor showing a sensing section having a magnet and a magnetic sensor disposed thereon in accordance with the concepts of the present invention.
FIG. 6B is an elevational view of the sensing section of the alternative hygiene compliance monitor that is attached to the dispensing nozzle of the dispensing container showing that the magnet is not detected by the magnetic sensor in accordance with the concepts of the present invention.
FIG. 6C is an elevational view of the sensing section of the alternative hygiene compliance monitor that is attached to the dispensing nozzle of the dispensing container showing that the magnet is detected by the magnetic sensor in accordance with the concepts of the present invention.
Figure 7:
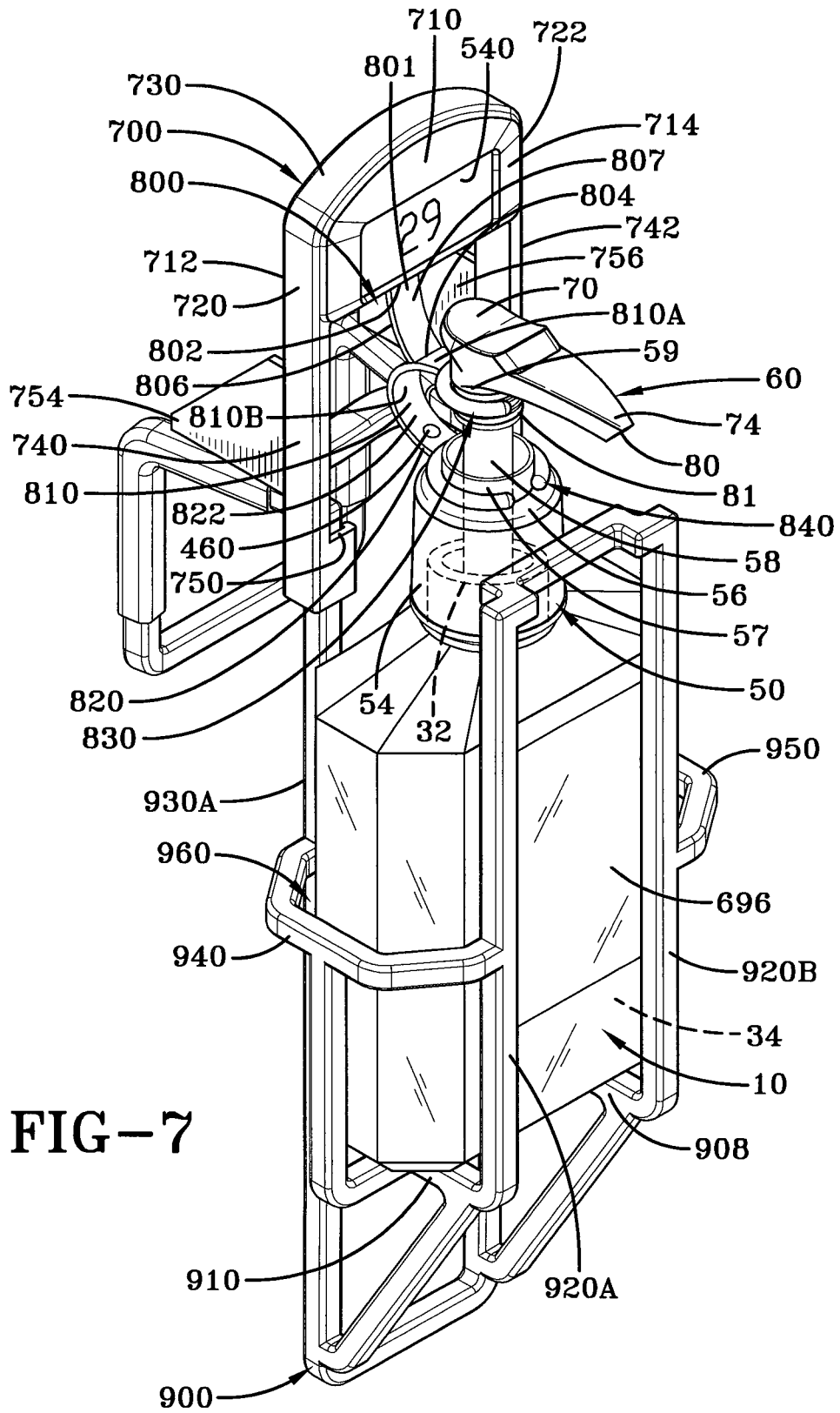
FIG. 7 is a perspective view of the alternative hygiene compliance monitor attached to the dispensing container and to a retainer in accordance with the concepts of the present invention.
Figure 8:
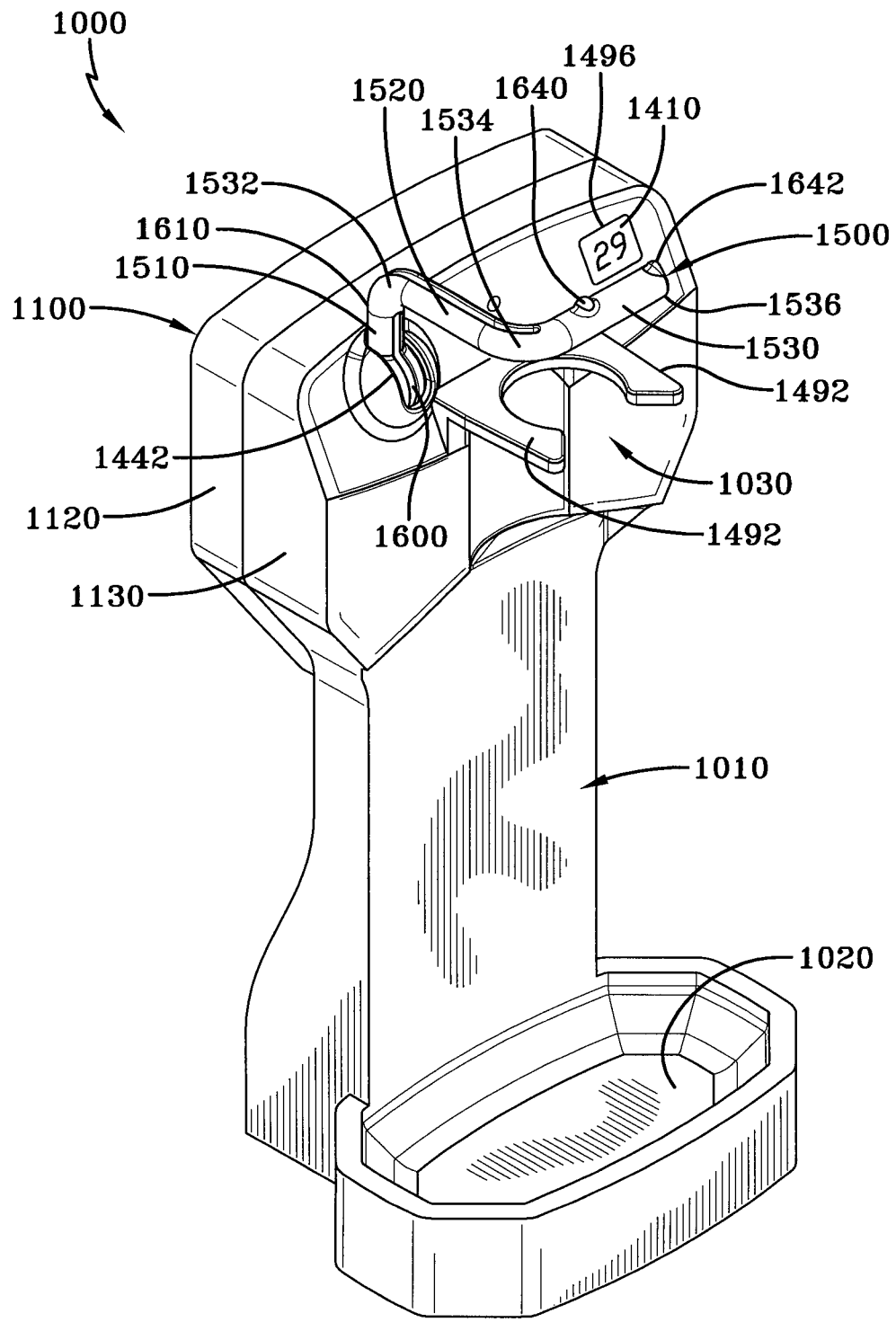
FIG. 8 is a perspective view of an alternative hygiene compliance monitor that utilizes a pivoting actuation arm in accordance with the concepts of the present invention.
Figure 9:
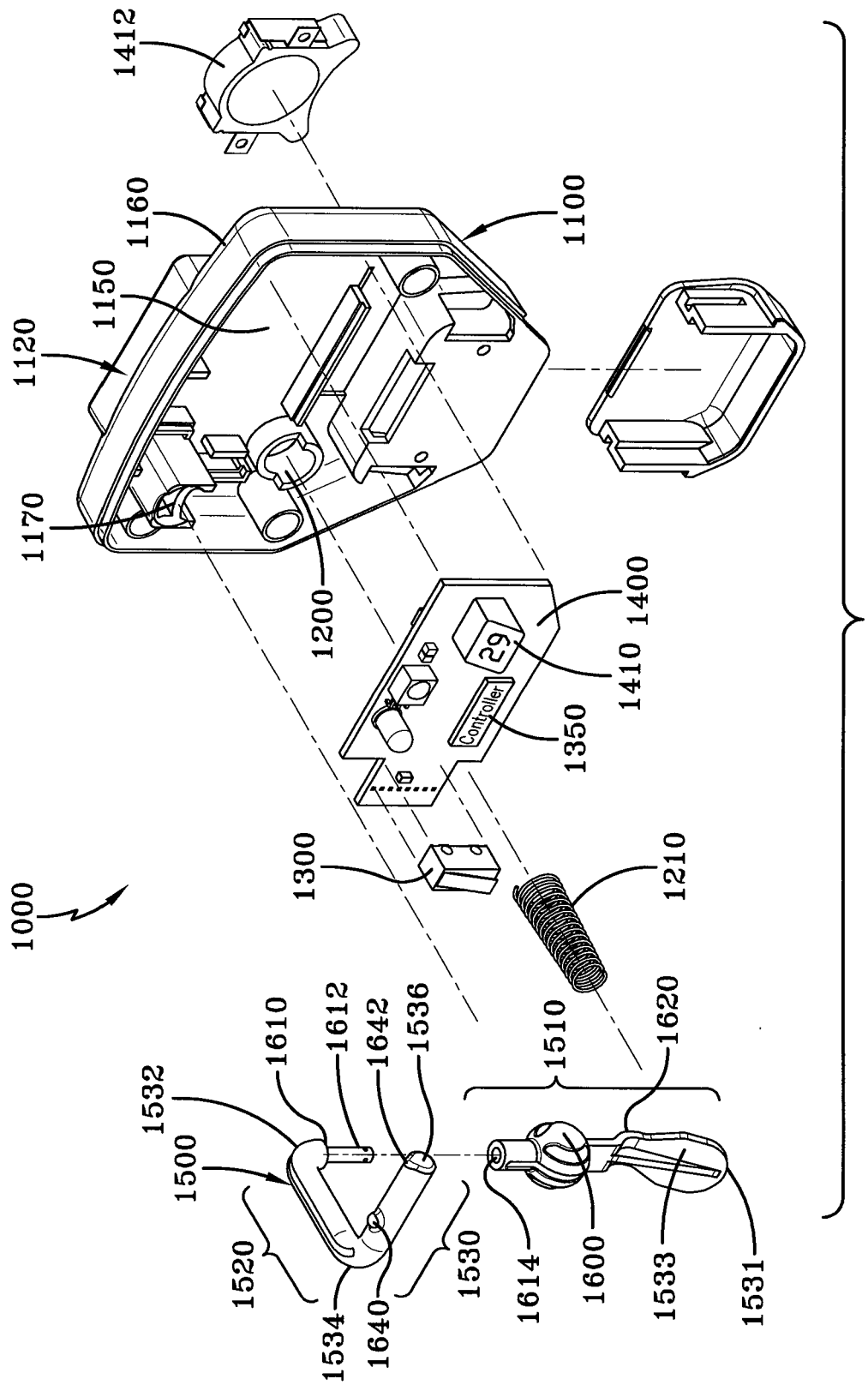
FIG. 9 is an exploded view of the alternative hygiene compliance monitor in accordance with the concepts of the present invention.
Figure 10:
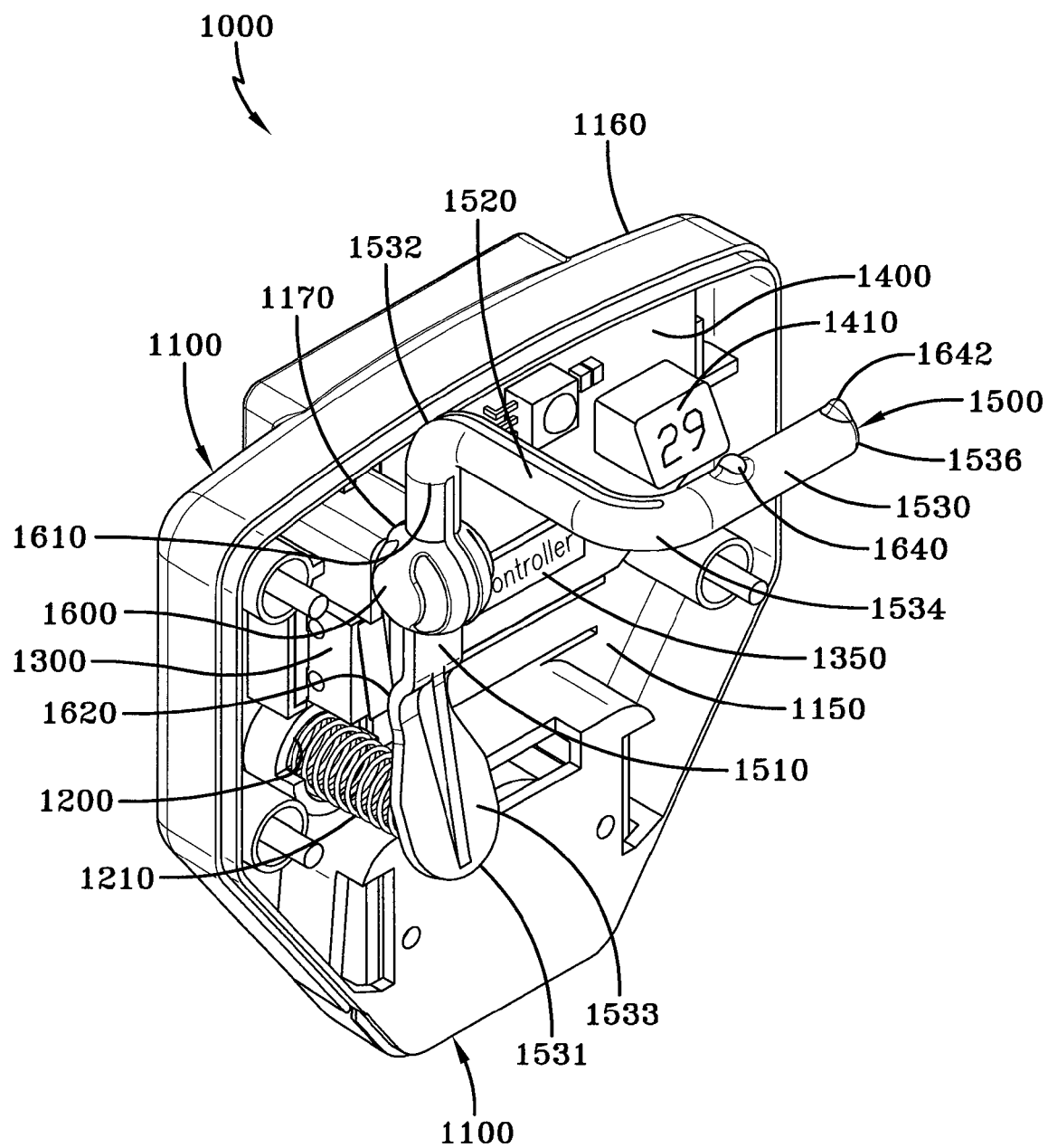
FIG. 10 is a perspective view of base plate of an actuation housing provided by the hygiene compliance monitor in accordance with the concepts of the present invention.

An alternative hygiene compliance monitor is referred to by numeral 700, as shown in FIG. 5-7 of the drawings. Specifically, the compliance monitor 700 comprises a housing 710 having opposed inner and outer surfaces 712 and 714. The housing 710 is bounded by substantially parallel lateral edges 720 and 722 that are joined by upper and lower edges 730 and 732. Extending from the lower edge 732 of the housing 710 at a point adjacent to the lateral edges 720,722 are respective arms 740 and 742 that are terminated by respective retention channels 750 and 752. Disposed in the housing 710 of the compliance monitor 700 is the controller 520, display 540, and power source 560 of the detection circuit 500, as previously discussed. Specifically, the display 540 is provided in the outer surface 714 of the housing 710. In one aspect, the housing 710 may also include support sections 754 and 756 that extend from respective arms 740 and 742 and which extend away from the outer surface 712 of the housing 710.

Extending from the lower edge 732 of the housing 710 is a flexible detection assembly 800. The detection assembly 800 comprises a primary section 801 having opposed edges 802 and 804 and opposed inner and outer surfaces 806,807. The detection assembly 800 also includes a sensing section 810 having opposed ends 818 and 819 and opposed inner and outer surfaces 820,822. Continuing, edge 804 of the primary section 801 is attached to the sensing section 810 about its midpoint, using any suitable means of fixation, such as adhesive, thermal welding, or the like. As such, the attachment of the primary section 801 to the sensing section 810 separates the sensing section 810 into an upper section designated as 810A that is disposed between end 818 of the sensing section 810 and the primary section 801, and a lower section designated as 810B that is disposed between end 819 of the sensing section 810 and the primary section 801. Furthermore, the primary section 801 and the sensing section 810 are formed from any suitable flexible material, such as flexible plastic, rubber, silicone, or the like.

The sensing section 810 comprises upper and lower flexible attachment clips 830 and 840 that are attached at respective ends 818,819 of the sensing section 810. The upper and lower attachment clips 830,840 each comprise respective arcuate gripping arms 860A,860B and 870A,870B that are separated by respective receiving slots 880A and 880B, which define respective annular retention apertures 890A and 890B. The token 460, such as a magnet for example, is carried on the outer surface 822 of the sensing section 810B proximate to the lower attachment clip 840, while the sensor 530, such as a magnetic sensor, is carried on the outer surface 822 of the sensing section 810A proximate to the upper attachment clip 830.

Specifically, the slots 880A,880B allow the nozzle neck 59 and the collar neck 57 of the dispensing container 10 to be received therethrough, so that the retention apertures 890A and 890B provided by respective upper and lower clips 830, 840 are able to receive the threaded section 81 of the nozzle neck 59 and the collar neck 57 respectively therein, as shown in FIGS. 6A and 6B. Furthermore, when the attachment clips 830 and 840 are attached to the dispensing container 10 that is not being used, the sections 810A and 810B of the sensing section 810 are spaced apart, as shown in FIG. 6B, whereby the magnet 460 is not detected by the magnetic sensor 530. However, when the nozzle 60 is depressed to dispense material, the sensing section 810 is flexed such that sections 810A and 810B are substantially parallel to each other, whereby the magnetic sensor 530 is brought into proximity of the magnet 460, as shown in FIG. 6C, whereupon the magnetic sensor 530 sends a signal to the controller 520 to increment a count value that is presented on the display 540, as previously discussed.

It is also contemplated that the compliance monitor 700 is attached to a retainer 900, as shown in FIG. 7. Specifically, the retainer 900 includes a lattice structure having a base 910 from which extend front retention arms 920A and 920B and rear retention arms 930A and 930B (not shown). In addition, the front and rear arms 920A,930A are joined by a lateral arm 940, and the front and rear arms 920B,930B are joined by a lateral arm 950. The arms 920-950 are spaced so as to form a receiving cavity 960 that is dimensioned to removably receive the dispensing container 10 therein. Attached to the rear retention arm 930 is a hanger 970 that is dimensioned to allow the retainer 900 to be attached to any desired structure where the presence of the dispensing container 10 is desired. In one aspect, the rear retention arms 930A-B are dimensioned to be received within the retention channels 750,752 of respective arms 740,742 of the compliance monitor 700 and attached thereto via a snap-fit or compression connection.

In yet another embodiment an alternative hygiene compliance monitor is referred to by numeral 1000, as shown in FIGS. 8-17 of the drawings. The hygiene compliance monitor 1000 comprises a retaining base 1010 having a base aperture 1020 and a retention aperture 1030 to retain a dispensing container 1040 therein. The dispensing container 1040 includes a vessel 1041 having a neck collar 1050 from which extends a manually-actuated pump 1060. The pump 1060 includes a straw 1062 that extends through the neck collar 1050 and an elongated dispensing nozzle 1070 that extends therefrom at a substantially right angle. The dispensing container 1040 is configured to dispense any suitable material from the dispensing nozzle 1070, such as soap, sanitizer, moisturizer, or the like when the pump 1060 is actuated. Furthermore, while the dispensing container 1040 is shown with a manually-actuated pump 1060, it should be appreciated that the pump 1060 may be configured as an automated system, which is operatively engaged upon the actuation of a switch/button or the detection of the presence of a user's hand. That is, when the dispensing nozzle 1070 is actuated, it moves relative to the collar 1050.

The retaining base 1010 of the compliance monitor 1000 also includes an actuation housing 1100. The actuation housing 1100 comprises a base plate 1120 and an access plate 1130 that are joined via any suitable fastener. The base plate 1120, shown clearly in FIGS. 9-10, includes opposed inner and outer surfaces 1150 and 1160. A concave base pivot surface 1170 is provided on the inner surface 1150 of the base plate 1120, while a biasing aperture 1200 is disposed there beneath and is dimensioned to receive a spring 1210 or other biasing device therein. Positioned between the pivot surface 1170 and the receiving aperture 1200 is a switch 1300, such as a microswitch or any other mechanical switch. The switch 1300 is coupled to a controller 1350 that includes the necessary hardware and software for carrying out the various functions to be discussed. The switch 1300 and controller 1350 are mounted on a circuit board 1400 that is attached to the inner surface 1150 of the base plate 1120. Also coupled to the controller 1350 and mounted to the circuit board 1400 is an indicator 1410, which may comprise a display, such as a numeric display. In one aspect, the indicator 1040 may comprise an LED (light emitting diode) display, LCD (liquid crystal display) display, or any other suitable indication or display device. The controller 1350 is powered by a power source 1412, such as a replaceable battery, that is carried by the base plate 1120.

Figure 11:
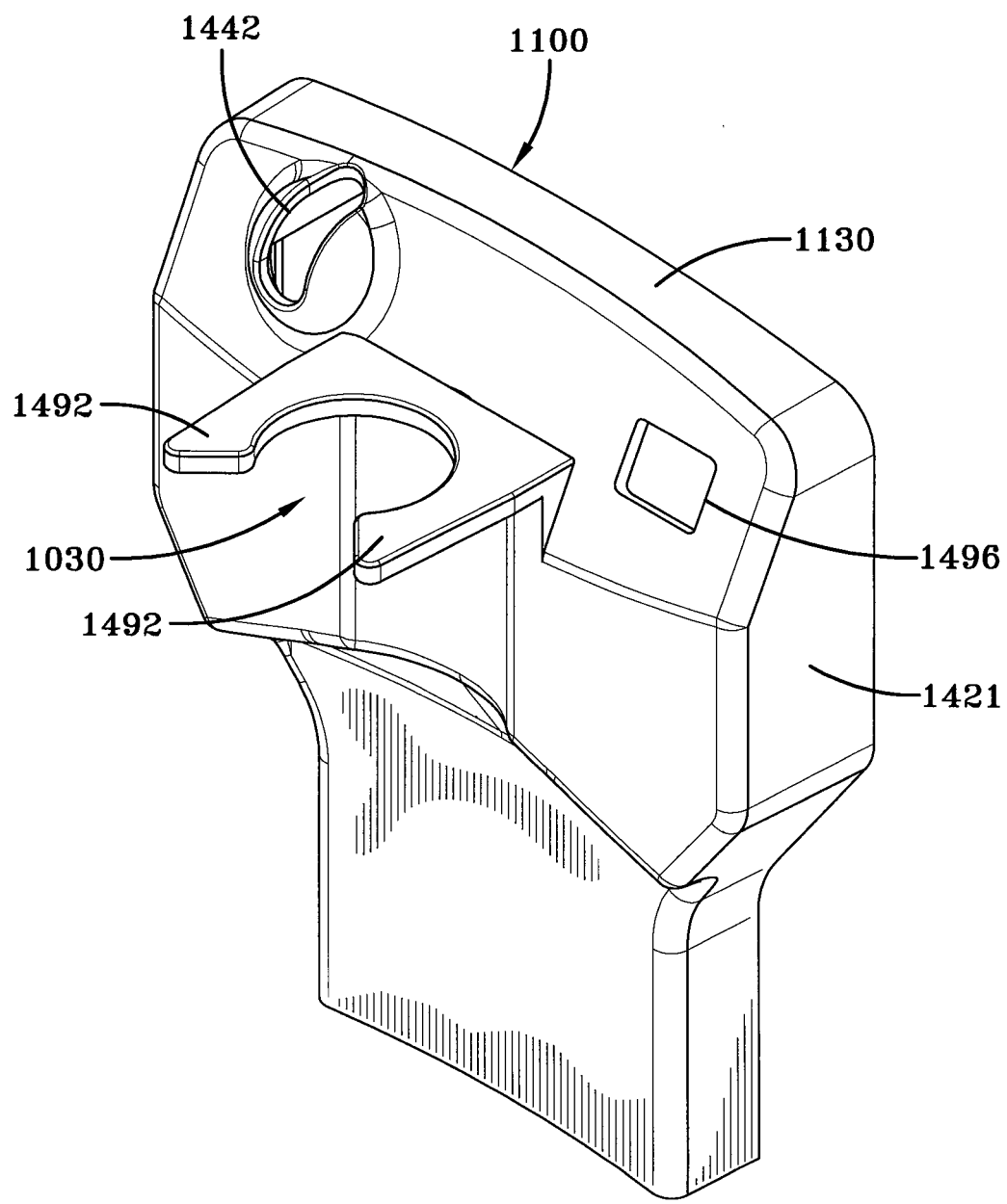
FIG. 11 is a front perspective view of an access plate configured to be attached to the base plate in accordance with the concepts of the present invention.
Figure 12:
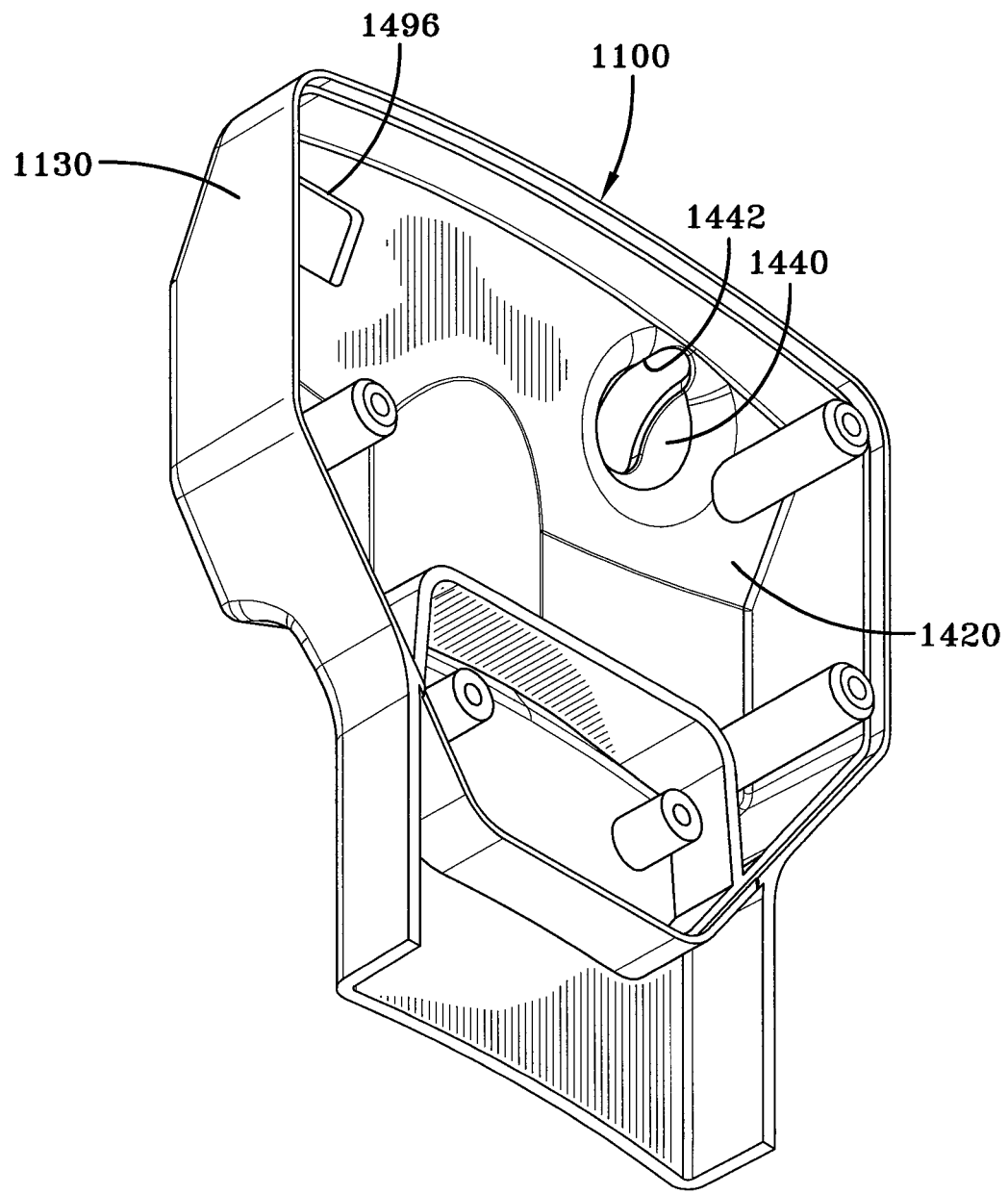
FIG. 12 is a rear perspective view of the access plate in accordance with the concepts of the present invention.
Figure 13:
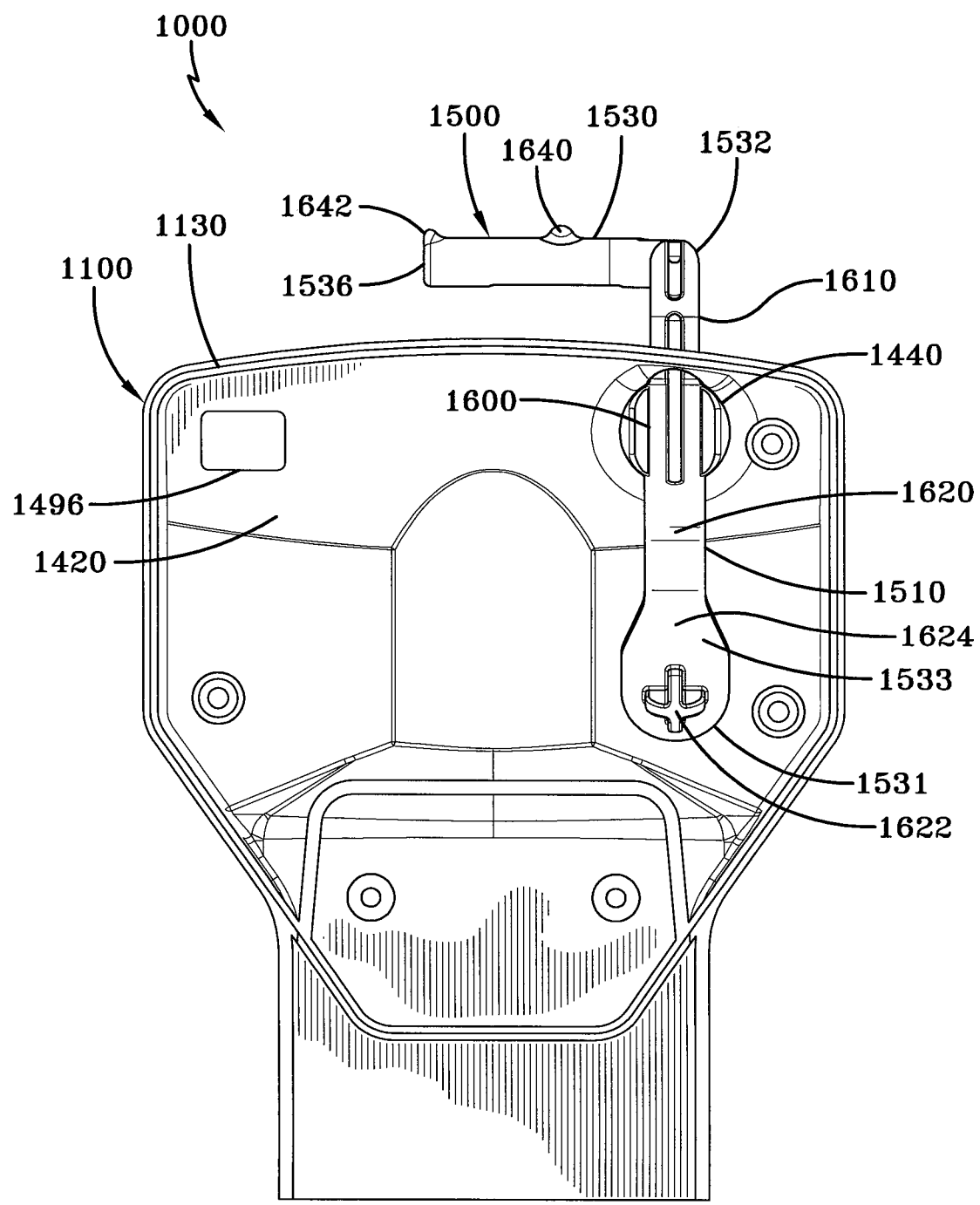
FIG. 13 is an elevational view of the inner surface of the access plate and actuation arm in accordance with the concepts of the present invention.
Figure 14:
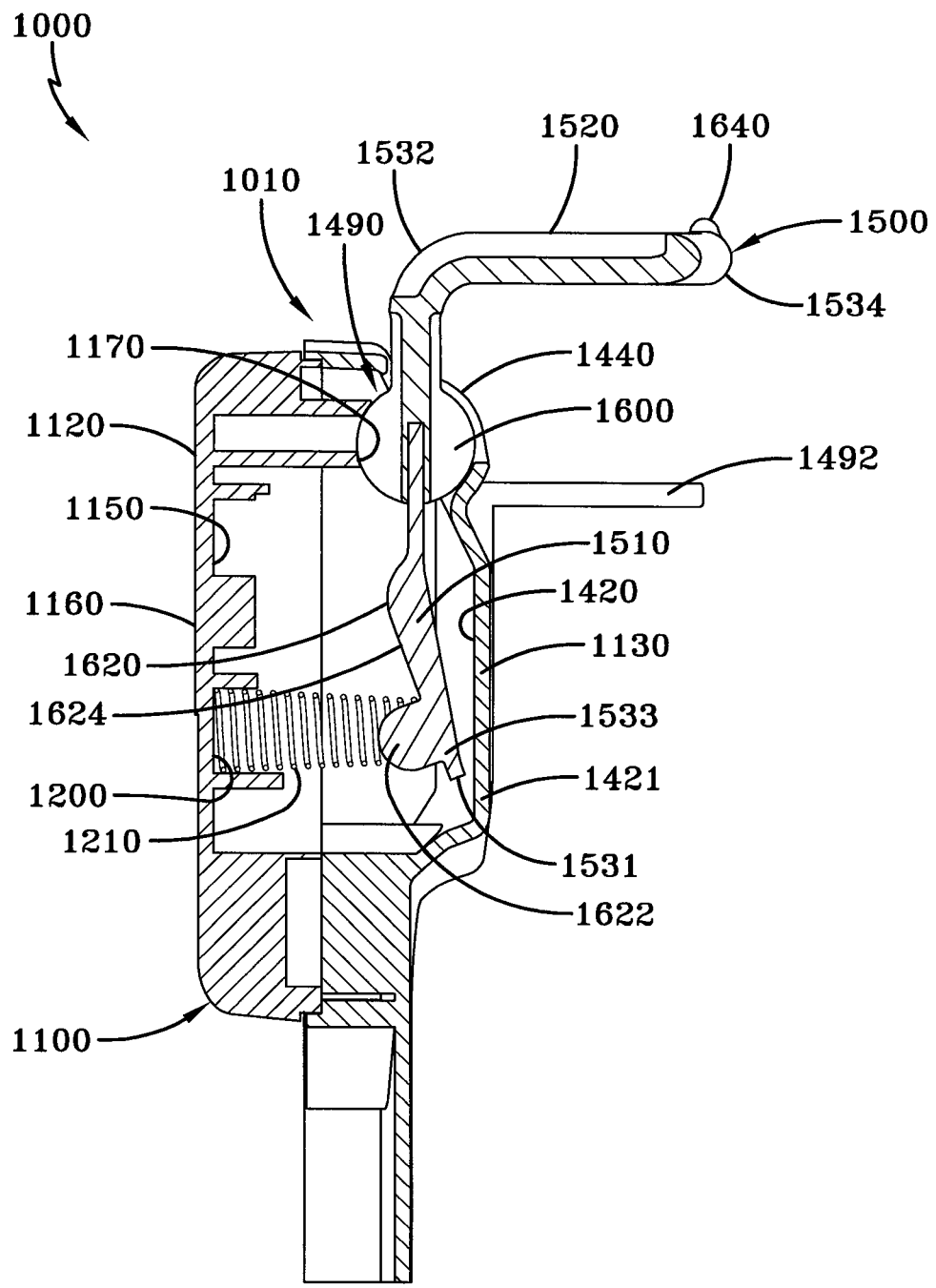
FIG. 14 is a cross-sectional view of the actuation housing and actuation arm in accordance with the concepts of the present invention.

The access plate 1130, as shown in FIGS. 11-13, includes inner and outer surfaces 1420 and 1421, whereby the inner surface 1420 includes a concave retaining pivot surface 1440 having a pivot aperture 1442 disposed therethrough. The retaining pivot surface 1440 is positioned adjacent to and in axial alignment with the base pivot surface 1170 when the base plate 1120 and the access plate 1130 are attached together. Specifically, the base pivot surface 1170 and the retaining pivot surface 1440 comprise concave surfaces that together form a substantially spherical retaining cavity 1490, as shown in FIG. 14. The outer surface 1421 of the access plate 1130 includes a pair of retaining arms 1492 that forms the retention aperture 1030 therebetween, which is configured to compressively retain the neck 1050 of the dispensing container 1040. The access plate 1130 also includes a window 1496 that is configured to be substantially aligned with the indicator 1410, so as to allow the operator of the compliance monitor 1000 to readily view the status of the indicator 1410.

The compliance monitor 1000 also includes an actuation arm 1500 that is pivotably carried by the retaining cavity 1490. In general, the actuation arm 1500 includes a support section 1510 from which an extension section 1520 extends at a substantially right angle therefrom, and an engagement section 1530 that extends from the extension section 1520 at a substantially right angle. Specifically, the actuation arm 1500 is configured such that the extension section 1520 extends from the end 1532 of the support section 1510 at a substantially right angle and is terminated at end 1534. Extending from end 1534 of the extension section 1520 at a substantially right angle is the engagement section 1530, which terminates at end 1536. Specifically, the support section 1510 includes ends 1531 and 1532, whereby a biasing member 1533 dimensioned to engage the spring 1210 is disposed at end 1531. Disposed between the biasing member 1533 and the end 1532 is a substantially spherical member 1600 that is dimensioned to be pivotably received within the retaining cavity 1490. It should be appreciated that the surface of the spherical member 1600 may include one or more recessed regions, so as to reduce the total amount of surface area of the spherical member 1600 that contacts the surfaces of the substantially spherical retaining cavity 1490. As such, the actuation arm 1500 is disposed within the actuation housing 1100, such that the extension section 1520 extends through the pivot aperture 1442 of the access plate 1130 at a substantially right angle, while the engagement section 1530 extends therefrom so as to be substantially parallel to the housing 1100. In particular, the extension section 1520 is pivotably joined to the support section 1510 by a pivot 1610, thus allowing the engagement section 1530 provided therewith to pivot or rotate. The pivot 1610, shown clearly in FIG. 9, comprises a cylindrical pivot section 1612, which extends from end 1532 and which is pivotably received within a pivot aperture 1614 that is provided by the support section 1510. It should be appreciated that the pivot section 1612 and/or pivot aperture 1614 includes tabs or other suitable means for pivotably retaining the support section 1510 to the extension section 1520. In addition, the biasing member 1533 includes a curved engagement surface 1620 and a retention tab 1622 disposed therebeneath a rear surface 1624. The curved engagement surface 1620 is dimensioned to engage the switch 1300 when the actuation arm 1500 is pivoted during operation of the monitor 1000. In addition, the retention tab 1622 serves to retain one end of the spring 1210 thereto as the spring is compressed and released as the actuation arm 1500 is pivoted during operation of the monitor 1000.

Figure 15:
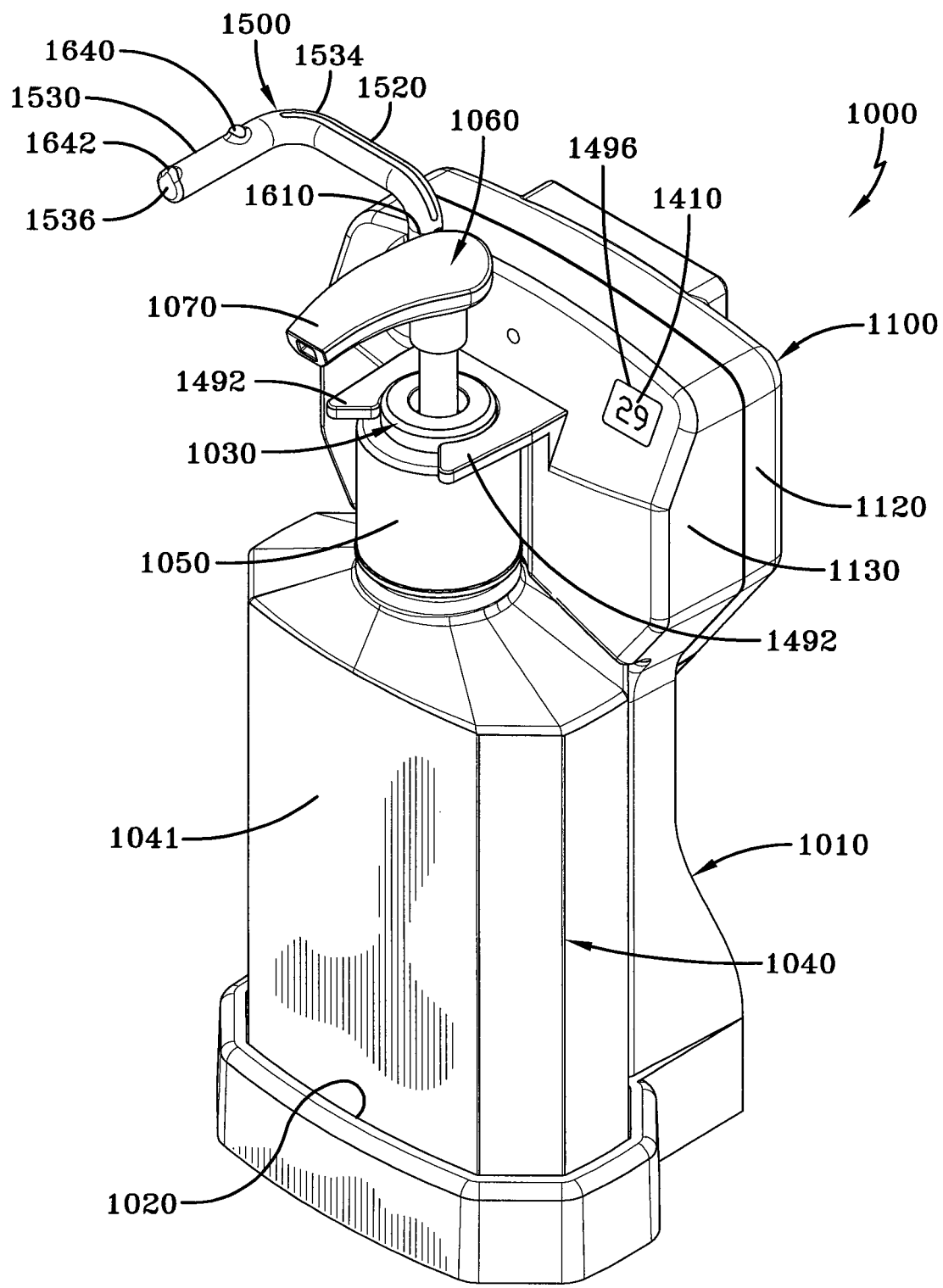
FIG. 15 is a perspective view of the alternative hygiene compliance monitor having a dispensing container installed therein in accordance with the concepts of the present invention.
Figure 16:
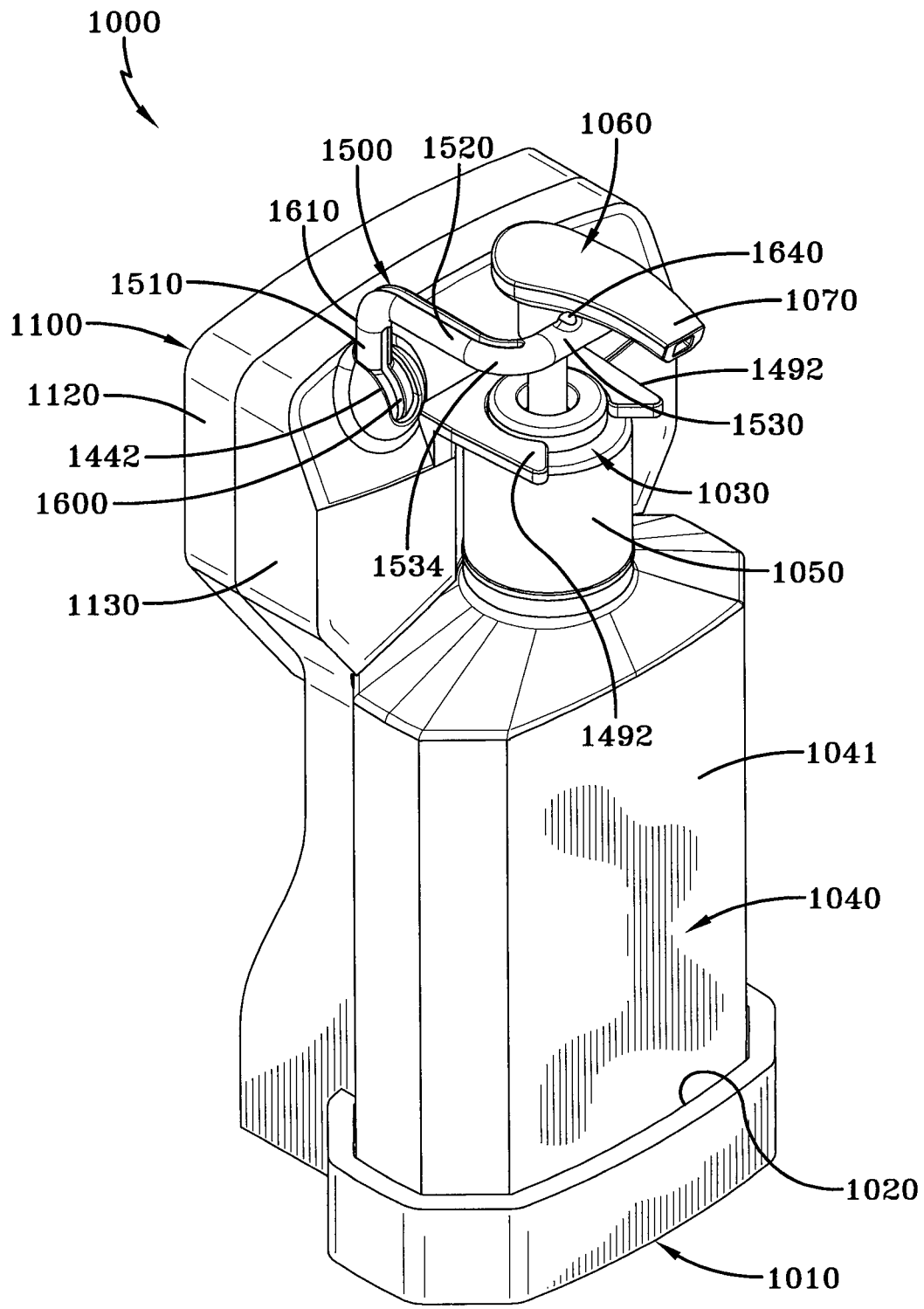
FIG. 16 is a perspective view of the alternative hygiene compliance monitor with the actuation arm in operative engagement with a nozzle provided by the dispensing container in accordance with the concepts of the present invention.
Figure 17:
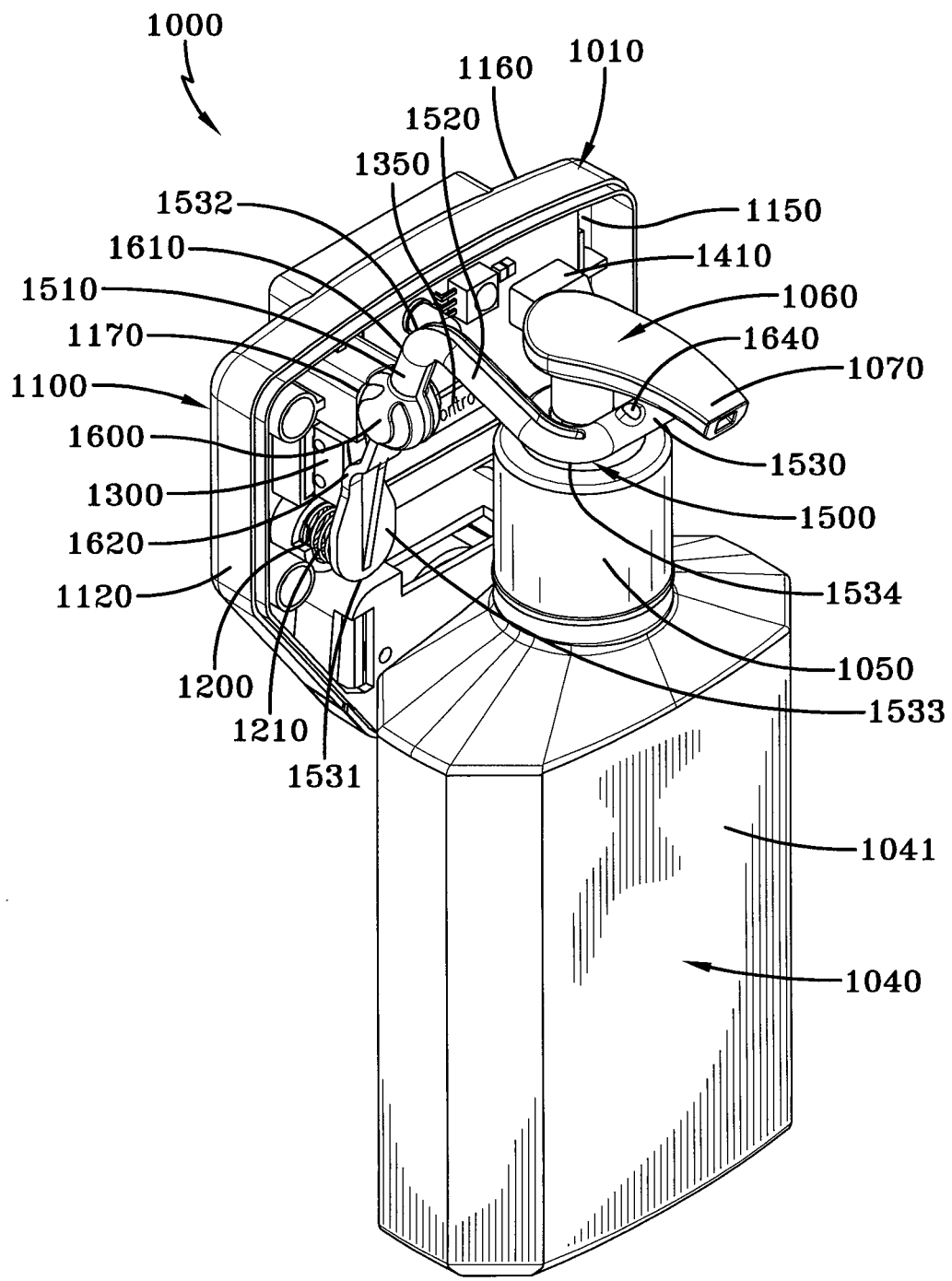
FIG. 17 is a perspective view of the hygiene compliance monitor with the access plate removed from the actuation housing and the actuation arm in operative engagement with the nozzle of the dispensing container in accordance with the concepts of the present invention.

Thus, when the compliance monitor 100 is placed into use, the actuation arm 1500 is rotated via the pivot 1610 to an open position, shown in FIG. 15, so that the dispensing container 1040 can be readily inserted into the receiving aperture 1020 of the retaining base 1010, while the neck 1050 of the dispensing container 1040 is received within the retention aperture 1030 and compressively retained thereby the retaining arms 1492. Once the dispensing container 1040 has been inserted into the retaining base 1010, the engagement section 1530 of the actuation arm 1500 is rotated via the pivot 1610 so that it is placed underneath the dispensing nozzle 1070, as shown in FIG. 16. Specifically, the engagement section 1530 is rotated so that retention tabs 1640 and 1642 extending from the engagement section 1530 are disposed on each side of the nozzle 1070, serving to trap or retain the nozzle 1070 therebetween. Once the engagement section 1530 is placed in position the dispensing container 1040 may then be placed into use, whereupon the depression of the pump 1060 results not only in the dispensing of material from the nozzle 1070, but also results in the biasing member 1533 of the support section 1510 being pivoted, so that the curved engagement surface 1620 engages the switch 1300 to indicate that a dispensing event has been completed, as shown in FIG. 17. The controller 1350 records the actuation of the switch 1300 and generates a count value identifying the total number of actuations of the pump 1060 that have occurred for a given dispensing container 1040, which is visually presented to the operator of the compliance monitor 1000 via the indicator 1410.

It is also contemplated that the hygiene compliance monitors 20, 700, and 1000 may include a data interface, such as a wired or wireless computer network interface that is coupled to the corresponding controller 520, 1350, and that is configured to communicate with a remote computing device to enable the remote computing device to acquire the count value data stored from the controllers 520, 1350.

It will, therefore, be appreciated that one advantage of one or more embodiments of the present invention is that a hygiene compliance monitor can be removably attached to a disposable or refillable dispensing container, such as a soap, sanitizer, or moisturizer container for example. Another advantage of the present invention is that a hygiene compliance monitor for a dispensing container is able to be quickly and readily installed to a dispenser without the use of tools. Still another advantage of the present invention is that a hygiene compliance monitor for a dispensing container can be manufactured with low cost. Yet another advantage of the present invention is that a hygiene compliance monitor is configured so that it can be attached to dispensers of various shapes and sizes. An additional advantage of the present invention is that the hygiene compliance monitor utilizes a pivoting actuation arm that is configured to detect the movement of a pump nozzle when it is actuated by a user to dispense material from a dispensing nozzle.

Thus, it can be seen that the objects of the present invention have been satisfied by the structure and its method for use presented above. While in accordance with the Patent Statutes, only the best mode and preferred embodiments have been presented and described in detail, it being understood that the invention is not limited thereto and thereby.

What is claimed is:

1. A hygiene compliance monitor for attachment to a dispensing container having a pump that dispenses material through a dispensing nozzle when the dispensing nozzle is actuated, the hygiene compliance monitor comprises:
   an elongated first flexible section having a receiving aperture disposed therethrough that is adapted to receive the dispensing nozzle therethrough, said first flexible section having a first and second end that are configured to be removably coupled together to retain said first flexible section to the dispensing container;
   a second flexible section having a first end and a second end, such that said first end of said second section is attached to said first flexible section;
   an attachment sleeve attached to said second end of said second flexible section, said attachment sleeve adapted to removably retain the dispensing nozzle of the dispensing container therein;
   a sensor carried by said first flexible section;
   a token carried by said attachment sleeve, said sensor configured to detect the presence and non-presence of said token, as said dispensing nozzle is actuated;

a controller coupled to said sensor, said controller maintaining a count value; and a data interface coupled to said controller, said data interface adapted to be in operative communication with a remote computing device to enable the acquisition of said count value;

wherein when the dispensing nozzle is actuated to dispense material from the dispensing container, said controller updates said count value based on the detection of the presence or non-presence of said token.

2. The hygiene compliance monitor of claim 1, further comprising:

a housing having a receiving slot, said housing adapted to removably retain the dispensing container therein;

wherein said receiving slot is dimensioned to receive at least a portion of said first flexible section therethrough, to attach said first flexible section to said housing.

3. The hygiene compliance monitor of claim 2, wherein said housing further comprises:

a base including a receiving slot;

first and second retaining arms attached to said base, said first and second retaining arms spaced apart to form a receiving cavity to removably retain the dispensing container therein; and a hanger attached to at least one of said first and second retaining arms.

4. The hygiene compliance monitor of claim 1, wherein said token comprises a magnet.

5. The hygiene compliance monitor of claim 1, wherein said token comprises a data tag.

6. A hygiene compliance monitor for attachment to a dispensing container having a dispensing nozzle that moves relative to a collar attached to the dispensing container, such that the dispensing nozzle dispenses material when actuated, the hygiene compliance monitor comprises:

a housing;

a first flexible section, said first flexible section being terminated at each end by an attachment clip, wherein one said clip is adapted to be attached to the dispensing nozzle, and the other said clip is adapted to be attached to the collar of the dispensing container;

a second flexible section extending from said first flexible section to a first end that is attached to said housing;

a token carried by said first flexible section;

a sensor configured to detect said token, and said sensor carried by said first flexible section, such that said sensor detects the presence and non-presence of said token as said dispensing nozzle is actuated;

a controller carried by said housing and coupled to said sensor, said controller configured to maintain a count value; and a data interface coupled to said controller, said data interface adapted to be in operative communication with a remote computing device to enable the acquisition of said count value;

wherein when the dispensing nozzle is actuated to dispense material from the dispensing container, said controller updates said count value based on the detection of the presence or non-presence of said token.

7. The hygiene compliance monitor of claim 6, wherein said token comprises a magnet.

8. The hygiene compliance monitor of claim 6, wherein said token comprises a data tag.

9. The hygiene compliance monitor of claim 6, wherein said housing is adapted to removably retain the dispensing container.

10. A hygiene compliance monitor for a dispensing container having a dispensing nozzle that moves relative to a collar attached to the dispensing container, such that the dispensing nozzle dispenses material when actuated, the hygiene compliance monitor comprising:

a housing configured to be attached to the dispensing container;

a controller carried by said housing, said controller maintaining a count value;

a switch coupled to said controller;

a data interface coupled to said controller, said data interface adapted to be in operative communication with a remote computing device to enable the acquisition of said count value; and an actuation arm pivotably carried by said housing and in operative engagement with said switch, said actuation arm configured to be moved into direct operative engagement with the dispensing nozzle of the dispensing container;

wherein as said actuation arm is pivoted upon the actuation of the dispensing nozzle to dispense material, said actuation arm toggles said switch to update said count value.

11. The hygiene compliance monitor of claim 10, wherein said actuation arm comprises:

a support section pivotably carried by said housing and configured to be in operative engagement with said switch;

an extension section that extends from said support section; and an engagement section that extends from said extension section and that is configured to be placed in operative engagement with the dispensing nozzle of the dispensing container.

12. The hygiene compliance monitor of claim 11, further comprising:

first and second retention tabs extending from said engagement section, said first and second retention tabs being spaced apart, so as to be adjacent to each respective side of the dispensing nozzle.

13. The hygiene compliance monitor of claim 11, wherein said extension section is configured to pivot relative to said support section to allow the engagement section to be selectively placed in operative engagement with the dispensing nozzle of the dispensing container.

14. The hygiene compliance monitor of claim 10, further comprising first and second spaced retaining arms extending from said housing, said first and second retaining arms adapted to removably retain the collar of the dispensing container.

15. The hygiene compliance monitor of claim 10, wherein said housing includes a base aperture adapted to carry at least a portion of the dispensing container therein.

* * * * *